(12) United States Patent
Marchal et al.

(10) Patent No.: US 7,972,647 B2
(45) Date of Patent: Jul. 5, 2011

(54) METHOD FOR IMPROVING A PROTEIN PRODUCT

(75) Inventors: Johannes Leonardus Maria Marchal, Groningen (NL); Henricus Martinus Joseph Nijssen, Paterswolde (NL); Elaine Rhonda Knott, Groningen (GB); Franciscus Antonius Robertus Krol, Assen (NL)

(73) Assignee: Cooperatie AVEBE U.A., Veendam (NL)

( * ) Notice: Subject to any disclaimer, the term of this patent is extended or adjusted under 35 U.S.C. 154(b) by 1028 days.

(21) Appl. No.: 10/479,644

(22) PCT Filed: May 22, 2002

(86) PCT No.: PCT/NL02/00323
§ 371 (c)(1),
(2), (4) Date: May 5, 2004

(87) PCT Pub. No.: WO02/100187
PCT Pub. Date: Dec. 19, 2002

(65) Prior Publication Data
US 2004/0175481 A1   Sep. 9, 2004

(30) Foreign Application Priority Data
Jun. 8, 2001 (EP) .................................... 01202219

(51) Int. Cl.
*A23K 1/00* (2006.01)
(52) U.S. Cl. ........................ 426/656; 426/615; 426/442
(58) Field of Classification Search ................. 426/656, 426/442
See application file for complete search history.

(56) References Cited

U.S. PATENT DOCUMENTS

| | | | | |
|---|---|---|---|---|
| 2,502,029 | A | * | 3/1950 | Sair et al. ........................ 426/46 |
| 3,617,307 | A | * | 11/1971 | Inklaar ........................... 426/332 |
| 3,814,816 | A | * | 6/1974 | Gunther ........................... 426/46 |
| 4,018,935 | A | | 4/1977 | Catlin et al. |
| 4,144,355 | A | | 3/1979 | Rawlings et al. |
| 4,147,807 | A | * | 4/1979 | Gryczka et al. ................. 426/56 |
| 5,726,033 | A | * | 3/1998 | Neumuller ................... 435/68.1 |

FOREIGN PATENT DOCUMENTS

| | | |
|---|---|---|
| DE | 19907725 A1 | 8/2000 |
| GB | 1520738 | 8/1978 |
| GB | 1544812 | 4/1979 |
| JP | 08140585 | 4/1996 |
| WO | WO 97/42834 | 11/1997 |

OTHER PUBLICATIONS

Thermo Electron Borchure. Star Series Tech Note. "pH of Cheese". 2005.*
The Online Merriam Webster Dictionary. 2009. http://www.merriam-webster.com/dictionary/paste.*
J. W. Finley, et al., "Recovery of soluble proteins from waste streams", *Food Product Development* 1976, 10:92-93.
Ralet, et al., "Fractionation of Potato Proteins: Solubility, Thermal Coagulation and Emulsifying Properties", Lebensmittel-Wissenschaft Und-Technologie 2000, 33:380-387.
Muschiolik, Gerald, et al., "Functional Properties of Faba Bean Products (Vicia faba)", Nutrition, Biochemistry and Processing, Report from Nutrition Science, Shaker Verlag, Aachen 2000, complete English translation.
"Polyacryl Compounds to Mercury", Ullmanns Encyclopedia of Industrial Chemistry, 4th Edition, vol. 19, Verlag Chemie, complete English translation.
Hansen, L.M. et al., "Oscillatory Rheometry of Starch-Water Systems; Effect of Starch Concentration and Temperature", American Assoc. of Cereal Chemists, Inc., vol. 68, No. 4, 1991, pp. 347-351.
Lu, Ting-Jang, et al., "Effect of granular characteristics on the viscoelastic properties of composites of amylose and waxy starches", Science Direct, Food Hydrocolloids 22 (2008), pp. 164-173, 2007 Elsevier.

* cited by examiner

*Primary Examiner* — Anthony Weier
(74) *Attorney, Agent, or Firm* — Hoffmann & Baron, LLP

(57) ABSTRACT

The invention relates to a method for improving one or more functional properties of a protein product, said method having the adjustment of the pH of the protein product to a value higher than 7. The invention further relates to a product having such a protein product and to the use of a protein product in a food product in order to improve one or more functional properties of the food product.

18 Claims, No Drawings

METHOD FOR IMPROVING A PROTEIN PRODUCT

This application is the U.S. National Phase of International Application Number PCT/NL02/00323 filed on 22 May 2002, which is incorporated herein by reference.

BACKGROUND OF THE INVENTION

The invention relates to a method for preparing a protein product with one or more improved functional properties. The invention further relates to a product comprising such a protein product and to the use of a protein product in a food product.

The proteins of vegetable material such as potatoes and other vegetables that are primarily cultivated as a source for starch have traditionally been regarded as a waste product. However, such proteins may be economically interesting alternatives to proteins from animal origin and their nutritional quality is competitive.

For the recovery of proteins from a juice generated during the starch production, heat coagulation is commonly regarded as an attractive method, at least from an industrial point of view. In "Ernährung Vol. 2, nr. 9, 1978, by Knorr and Steyrer", a method is described wherein proteins are recovered from an acidified juice that is heated to a temperature of approximately 98-99° C. The protein fraction is thereafter concentrated by centrifugation. Next, the pH of the fraction is adjusted to pH 7, after which the product is dried by freeze drying, spray drying or drum drying. It was found that the water binding properties were least reduced in a potato protein concentrate that had been freeze dried.

In "Lebensm. Wiss. u. Technol. 13, 297-301 (1980)", Knorr reports the effect of the pH prior to drying on the water binding properties of a potato protein product that has been obtained by acidic and thermal coagulation. The pH of the protein coagulate is neutralised to pH 7 with NaOH, prior to a drying step. The neutralised protein coagulate is freeze dried or spray dried and ground. The publication shows water-binding properties of the resulting protein products within the range of pH 5-7. Depending upon the exact process, the effect of the pH varied from a marginal increase to a considerable decrease in the water binding capacity. The results do not indicate a trend of a particular dependency of the water binding capacity on the pH value, so it is not possible to predict an effect of the pH upon the water-binding of a protein product. As far as an improvement may be realised, such an improvement is not sufficient, in particular not for demanding applications.

In Lebensm. Wiss. u. Technol. Vol. 5 (1972) no. 1, pp. 24-29, A. M. Hermanson reports about food swelling properties of three protein products. The protein products have a solubility in water of 55-90 wt. % and give rise to a neutral pH (6.5-7.4) in water. A 10% dispersion in an aqueous solution of each protein product was gelled—after sealing the dispersions in cans—by heating the dispersions for 30 min. Thereafter, the samples were cooled in an ice bath. The effect of pH is shown by using an aqueous buffer solution comprising glycine-NaOH or K-biphtalate-NaOH. Sodium-caseinate showed a much higher increase in fluid uptake with increasing pH than soy bean protein isolate or whey protein isolate. For the soy-bean protein isolate, the swelling behaviour was consistent with a high viscosity, whereas the whey protein product, having a much lower viscosity, did not maintain its water when it was pressed. Further it was reported that a higher ionic strength negatively influenced the swelling, in particular for the soy bean.

According to WO 97/42834, heat coagulation of proteins from potato juice causes the proteins to denaturate, and as a consequence the proteins lose their functional properties, i.e. a loss of emulsifying capacity, foaming capacity, thermogelling capacity, water binding capacity. Even the most essential requirement for its application in the food industry—solubility in, water—cannot be met. Therefore, in WO 97/42834 it is proposed to recover proteins from potato juice in non-denaturating conditions. This is achieved by concentrating the protein by subsequently subjecting the juice to disc stack centrifugation, ultrafiltration, diafiltration and optionally freeze-drying. Such a method is however laborious, relatively expensive and special precautions with respect to the temperature have to be taken in order to avoid denaturation. In addition, a method making use of ultrafiltration and the like, may be disadvantageous with respect to the microbiological controllability.

The loss of functional properties of a protein product is undesired in many applications. Loss of water-binding or fat-binding capabilities of a protein product may for example, make the use of a protein product in a food product less attractive, because high water- and/or fat-binding properties may contribute to avoiding curdling or another form of phase separation in a food product. Even if the water-binding or fat-binding capabilities are satisfactory, several known products give rise to an undesired flavour or odour when processed further, making them less suitable for food applications. Other drawbacks of known protein products include pricing of the raw materials and a high viscosity.

It is an object of the invention to provide an economically attractive method that allows the production of a protein product with satisfactory functional properties. It is further an object of the invention to improve one or more functional properties of a vegetable protein product in comparison to products comprised in the state of the art.

SUMMARY OF THE INVENTION

It has been found that one or more functional properties of a vegetable protein product comprising one or more proteins originating from a root or tuber commonly used for starch production, can be improved by adjusting the pH of a protein product to a value higher than 7.

Accordingly, the invention relates to a method for improving one or more functional properties of a vegetable protein product, said method comprising the adjustment of the pH of a protein product to a value higher than 7.

The invention further relates a method for preparing a vegetable protein product, comprising the isolation of a protein product from a root or tuber commonly used for starch production and the adjustment of the pH value of the resulting isolated protein product to a value higher than 7.

In contrast to pH treatment for making a protein product less acidic to neutral, a surprisingly positive relationship exists between one or more functional properties and the pH, when a protein product is brought to an alkaline pH.

A method according to the invention has been found to give rise to a product with very satisfactory functional properties. In particular, a method according to the invention can be carried out to prepare a product of which one or more functional properties remain on a surprisingly high level, even if the protein product is processed in a food product of which the pH is significantly different from the pH of the protein product.

A method according to the invention has been found to be particularly suitable to provide a protein product wherein the water-binding and/or fat-binding properties are improved. A method according to the invention allows the preparation of a protein product with highly desirable neutral taste, mouth-feel and/or odour characteristics. The obtained product may have a relatively low viscosity in comparison to some conventionally obtained protein products derived from plant-material, such as commercially available soy-bean protein. A lower viscosity is advantageous because it makes further processing easier. Further, a protein product obtainable according to a method of the present invention does not have to be hydrated prior to using it.

It is further an advantage of the invention that it provides an attractive method for industrial application, both for economic and technical reasons. No special equipment is required and the method can be carried out within a limited processing time.

DETAILED DESCRIPTION OF THE INVENTION

A vegetable protein product of which one or more functional properties may be improved according to the invention, can be of various natural sources, such as gluten, peas, rice and the like. Preferably, said vegetable protein product comprises one or more proteins originating from a root or tuber commonly used for starch production. In other words, a root or tuber that is usually processed in the starch production is according to the invention used as a protein source. In still other words, a vegetable protein product comprises one or more proteins originating from a root or tuber of a plant chosen from the group of plants formed by tuberous plants and root crops that are suitable as a source for starch. These one or more proteins may for example originate from the liquor being formed in a process to make a starch product from a tuber or root.

A method according to the invention is particularly suitable for treatment of a protein product comprising one or more proteins from potato, waxy potato (e.g. potato of which the starch content comprises 95-100% amylopectin), arrow root, cassaya (tapioca), waxy cassaya (high amylopectin tapioca), sweet potato, yam and/or taro. In a particularly preferred embodiment the protein product is a potato protein product.

A method according to the invention may also be employed using a protein product obtained from a grass—e.g. wheat or rice, including their high amylopectin variants. The whole plant may be used or a part thereof, e.g. roots, stems, leaves or grains.

A method according to the invention has been found to be particularly suitable for protein products wherein the bulk of the proteins has an iso-electric point below pH 6.5, preferably in the range of about pH 4 to 6 and for proteins with a relatively low solubility in water, e.g. below 50 wt. % or even below 25-20 wt. %.

Inter alia, from an economic perspective, the present invention provides a method that is very attractive for treating a protein product from a potato, a maize, tapioca or another raw material for starch production, since the protein fraction of such a source is traditionally regarded as a waste product. Potato protein, for example, is obtained as a by-product in the recovery of potato starch from potatoes. In the potato starch manufacture, using mechanical separation techniques, the potato is processed into potato starch, potato pulp and potato juice (also referred to as potato liquor). In the potato juice, the potato proteins are present in dissolved conditions.

The protein product may substantially consist of proteins, but it is also possible that it comprises components from the plant from which the protein product is obtained. It is also possible to carry out a method according to the invention with a protein product to which one or more components have been added. In particular a protein product may comprise one or more compounds selected from the group formed by lipids, carbohydrates—including starches, sugars, celluloses and modified carbohydrates and/or salts.

A protein product may comprise fibres, such as potato-fibres and/or grass-fibres. Such fibres may be native or modified fibres. The term modified or derivatised is defined herein as to be chemically, physically, enzymatically or otherwise treated. The presence of fibres in a protein product may help to improve water and fat binding properties of the protein product. The fibres may for example be added in the form of a potato fraction, which may contain starch (e.g. approximately 85%) and fibres (e.g. about 10%). Such fibres may contain water, cellulose, pectin, starch, hemicellulose, glycoproteins and lignin.

The protein product may be a commercially available protein product, e.g. Protastar (Avebe) or cassaya protein. A protein product may also be obtained in any other way, e.g. by acidic denaturation or by thermal coagulation, e.g. as disclosed in U.S. Pat. No. 6,187,367. Ultrafiltration, e.g. as described in WO 97/42834, is also suitable to obtain a protein product that can be treated according to the invention. Very good results have been achieved with a protein product, obtained by using a method as is disclosed in WO 97/03571.

In a preferred embodiment, a protein product is isolated from vegetable material by thermal coagulation. Thermal coagulation offers several operational advantages, such as the simplicity of the process and the easiness to separate the protein product from the raw material. Thermal coagulation also has a beneficial effect upon several qualitative parameters of the protein product, such as the microbiological quality, the inactivation of enzymes and the loss of anti-nutritional factors (e.g. due to degradation) such as trypsin inhibitors.

A particularly preferred thermal coagulation method is a method wherein the juice of a plant or a part thereof, e.g. potato juice, is subjected to an acid, heat treatment, or a combination thereof. The temperatures used for heat coagulation can be from 23 to 140° C. More preferred are temperatures between 75 and 120° C., and even more preferred are temperatures between 95-110° C. The temperature may be raised for example by direct steam injection or using a heat-exchanger. The pH value can be anywhere in the range of 1-8. Preferably the pH value is between 3.5 and 6.2 and more preferred the pH-value is at about the iso-electric point of the bulk of the protein proteins (usually for potatoes around pH 5).

The thus coagulated flocculant protein material can be separated from the liquid phase by a filter, separator, decanter or the like, yielding a separated wet potato cake, which can subsequently be partially or fully dried.

A coagulated protein product, e.g. a potato protein product, may contain contaminants in the form of glyco-alkaloids, water-insoluble polymers of the melanine type and flavouring substances. Glyco-alkaloids consist of carbohydrates that are glycosidically linked to a basic aglycone. In potato protein products, solanine and chaconine are the most important glyco-alkaloids. The total amount of glyco-alkaloids (TGA) in the heat coagulated unpurified potato proteins products can vary between 500 and 5000 mg/kg (based on dry substance). It is known that glyco-alkaloids can give rise to poisoning symptoms upon consumption by humans or animals the glyco-alkoloid solanine possesses a direct toxicity due to its choline-esterase inhibiting action in the central nervous system. In addition, solanine has a bitter taste and gives a burning sensation upon consumption. To reduce the amount of glyco-alkaloids, undesired aromatic and flavouring substances, the potato protein can be washed by an acid treatment, using an organic extraction, or a combination of both. In a preferred embodiment the acid treatment takes place in an in-line process, followed by the pH adjustment which is performed to improve one or more functional properties of the protein product.

It has been found that solutions comprising one or more inorganic acids, e.g. hydrochloric acid, nitric acid, phosphoric acid, sulphuric acid, are very suitable as wash solution to remove glyco-alkoloids and the like from a protein material. The resulting protein product is particularly suitable for human consumption.

Although the thus produced protein is in principle adequate for human or animal consumption, properties such as taste, mouth feel, water and fat binding capacity may be improved by a pH treatment with a method according to the present invention.

In a preferred embodiment, the pH of the protein product is adjusted to a value of at least about 7.4, in a more preferred embodiment to a pH of at least about 8. Very good results have also been achieved with a method wherein the protein product was adjusted to a pH of about 8.2 or higher. A product resulting from one of these methods has been found to give rise to particularly improved sensoric properties (such as mouth-feel and taste), low viscosity, high water-binding and/or fat-binding properties. A thus obtained product may also be processed farther without any need to wet the product. In another preferred embodiment the pH is kept below 10.5, more preferably below 9.5.

The adjustment of the pH may very conveniently be achieved in any known way, such as by adding an organic or inorganic base. In a preferred embodiment the pH is adjusted by adding at least one inorganic base. Very good results have been achieved with one or more bases selected from the group formed by the alkali metal and alkali earth metal salts of hydroxide, carbonate, bicarbonate, phosphate, monohydrogenphosphate, etc. Preferred alkali metal and alkali earth metal moieties are sodium, calcium, magnesium and/or potassium. Very good results have been achieved with sodium hydroxide as a base for adjusting the pH.

The base may be added to the protein product in any way. The form of the protein product that is to be treated according to the invention, may depend on prior processes that the product has undergone, e.g. the isolation process of the product and the further processing thereafter.

A pH treatment according to the invention may be performed on a wholly or partially dried coagulated protein product, without first needing to hydrate the protein product. Thus the method may be carried out under conditions, wherein the protein is not or not fully solubilised. Preferably the dry substance content is chosen in the range of 5-99 wt. % more preferably in the range of 10-50% and even more preferably in the range of 20 to 40%.

In case the protein product is in a solution or slurry form, the base may for example be dissolved in water and be added drop-wise. Over-exposure of protein particles to alkali is adequately prevented in a method wherein the protein product is in a slurry or solution, thus preventing the generation of undesired black spots or glassy hard particles.

In case the protein product is a cake a paste or has a semi-dry form (e.g. a powder), the base may be dissolved in water and added drop-wise or by spraying to the cake, paste or semi-dry form. In a preferred embodiment, a base is added to a decanter-like cake, shortly after having been formed.

The pH adjustment is preferably carried out while the protein product is being homogenised. In addition or alternatively the protein product may be homogenised after the pH adjustment. Homogenisation may be carried out in any known manner, such as by stirring, agitating, blending or kneading. Homogenisation not only results in a very uniform product, but also contributes to the prevention of the formation of black-spots or hard particles.

The temperature during the pH adjustment is not particularly critical and is preferably chosen in the range of 0-100° C. Particularly good results have been achieved at a temperature in the range of about 10-30° C., e.g. at about 20° C.

After the pH adjustment the protein product may be further processed. It may for example be wholly or partially dried. This may be done to achieve a desired shelf-life. For many applications the moisture content will be in the range of about 0-20 wt. % water (kg water/(kg water+kg dry substance)), e.g. 10-15 wt. %. In a preferred embodiment the protein product is dried to a water content of less than 12 wt. %.

Drying may be performed by any method available to remove water, for example by flash drying, ring drying, spray drying, fluid bed drying, zeolyte drying or a combination thereof.

A preferred way of drying is flash ring drying. In a much preferred flash ring drying process, the inlet temperature is chosen in the range of about 120-400° C., more preferably about 150-250° C. and/or the outlet temperature in the range of 50-150° C., more preferably about 70-130° C. In an even more preferred embodiment the inlet temperature is in the range of 180-190° C. and the outlet temperature is in the range of 65-85° C.

The present invention further relates to a protein product that is obtainable by a method according to the invention. Preferably a protein product that can be obtained by a method according to the invention has improved water-binding properties and/or improved fat-binding properties. Further, a protein product according to the invention has a very low solubility in water, at various pH's. In particular, the solubility of the protein product in water at a pH in the range of 5-10 is below 5 wt. %, preferably below 2.5 wt. %, based on the weight of the solution.

Such a protein product may be used advantageously in a range of products, including food products for animal or human consumption, e.g. in a snack product, a canned meat product or in a meat substitute. In another embodiment a protein product according to the invention has improved sensoric properties, such as improved mouth feel, odour and/or taste.

A protein product according to the invention may for example be used in a food product in order to improve the water- and/or fat-retention of said food product. The absence of an undesirable odour and taste, a viscosity that allows easy handling and the possibility to use a protein product according to the invention without having to hydrate it, makes such a product very attractive to use in many food products.

It has been found that a protein product is capable to such an improvement under varying conditions. It is for example not necessary that the pH of the food product is approximately the same as the pH of the protein product. A protein product may be very suitably used to improve the water- and/or fat-retention of a food product, wherein the food product has a pH below 7. It has been found possible to prepare a food product with one or more surprisingly good properties that have been achieved by using a protein product in a food product having a in a pH in the range of pH 4-7.

Accordingly the present invention also relates to a food product, comprising a protein product according the invention. It has been found that a food product according to the invention has a surprisingly good water and/or fat retention, even if it is stored for a considerable time. In particular, it has been found that the water-binding and/or fat-binding properties of a food product comprising a protein product obtainable by a method according to the invention, are surprisingly well in comparison to a food product comprising a conventionally obtained protein product.

A food product according to the invention—such as a "hot-dog" or a vegetarian meat-substitute—may be pasteurised, sterilised and/or emulsified whilst retaining a surprisingly good quality.

The invention will now be illustrated by the following examples.

Example 1

Processing of a Protein Product Cake

A decanter-like potato protein cake of 28 wt. % dry substance was prepared by mixing 1.5 kg Protastar (Supplier: Avebe) and 3.268 kg water. The resulting cake was fed to a FKM 130 D Lödige mixing device. A solution of 20% (w/w) NaOH was sprayed on the protein cake to give the desired pH (pH was measured at 20° C. in a 10 wt. % suspension).

For adjusting the pH of a cake to pH 7.0, about 0.56 mol NaOH/kg protein was required. In another batch, the pH was adjusted to pH 9.0, requiring about 0.82 mol NaOH/kg protein.

After reaching the desired pH, each wet cake was stored for 15 min. Thereafter, each cake was pneumatically flash-dried to a moisture content of about 7.5%, under conditions as shown in Table 1.

It was found that the product treated at pH 9 could easily be fed directly into the pneumatic dryer and was very crumbly despite the dry weight content. The product treated at pH 7, however, could not be fed directly into the pneumatic dryer. Therefor a small portion of approximately 95 wt. % to pH 7 adjusted Protastar, obtained from a spray dried slurry was used to begin with back-mixing and pneumatic drying of the pH 7 adjusted Protastar that was prepared as described above. All pH adjusted products were passed twice through a small 50 mm pneumatic flash drier at an inlet temperature of 185° C. Some details for the different products are summarised in Table 1.

TABLE 1

| Product | wt. % protein (based upon dry substance) | wt. % moisture (H₂O/total) | $T_{outlet}$ [° C.] (1$^{st}$ and 2$^{nd}$ dry-step) |
|---|---|---|---|
| pH 7 treated Protastar | 86.8 | 7.5 | 83 and 89 |
| pH 8 treated Protastar | 86.2 | 11.02 | 82 |
| pH 9 treated Protastar | 85.3 | 7.34 | 74 and 82 |
| pH 8 treated Protastar (80%) + aglomyl[1] (20%) | 73 | 14.61 | 68 |

[1]Agglomyl: a starch product, containing approximately 2% protein, 8-10% fibres, 10-15% water.

Each dried pH adjusted product and an untreated Protastar product were tested for its water-binding capacity. 19 grams of water were added to 1 gram of dried protein product and the resulting mixture was homogenised. The mixture was kept at 70° C. for 30 minutes. After cooling to room temperature and centrifuging (15 min, 3350 G), the water that had not bound to the pellet formed by the protein product, was released. The water binding (in grams per gram of protein) was calculated as the weight of the pellet minus 1. The results are shown in Table 2.

TABLE 2

| Product | Water-binding capacity (gram water/gram dry substance) |
|---|---|
| untreated Protastar | 3.2 |
| pH 7 treated Protastar | 3.7 |
| pH 8 treated Protastar | 4.6 |
| pH 9 treated Protastar | 5.8 |
| pH 8 treated Protastar (80%) + aglomyl (20%) | 4.2* |

*gram water/gram protein + agglomyl

Example 2

A dry potato protein powder (moisture content 11 wt. %) was continuously fed to a Schugi 160 mixer. A 20 wt. % NaOH solution was sprayed on the powder to give the desired pH (20° C., 10 wt. % suspension). After reaching the desired pH, the wet cake was stored for 15 min. Hereafter the resulting cake of the protein product was continuously fed to a fluid bed dryer to a moisture content of 10 wt. %.

Example 3

A 10 wt. % potato protein slurry was made. The pH of the slurry was adjusted to the desired pH (at 50° C.) with 33 wt. % NaOH solution under continuous mixing. After 4 hours at 50° C., the slurry was spray dried to a moisture content of 9 wt. %.

Example 4

A decanter cake of Protastar with a dry substance content of 29-33 wt. % and a protein content of 860-900 mg/g dry substance was sprayed with a NaOH solution (20-25 wt. %) and mixed at room temperature in a Lodige mixer (KM 300 DW). The mixer formed the cake into a fluidised-bed like form. The amount of reagent was added in an amount to yield a dried product with a desired pH. As a guideline, typically 70-80 ml/kg dry substance was required in order to yield a product with a pH of 9-10.

After a mixing time of several minutes, the treated cake was dried in a flashdrier with back-powdering. The inlet temperature was in the range of 200-280° C.; the outlet temperature was about 100° C.

Example 5

Several types of meat loaf products were made with different protein products, of which the details are shown in Table 3. The beef/pork meat loaf ingredients are shown in Table 4.

TABLE 3

| Code | Meat type | Recipe/Process | Sample description | % Protein | pH of raw material | Raw material |
|---|---|---|---|---|---|---|
| Series 1 | | | | | | |
| 1 | Pork/Beef | Pasteurised | Protastar (not pH treated) | 85 | 3.5 | Protastar |
| 2 | Pork/Beef | Pasteurised | pH treated Protastar (acc. to Example 4) | 84 | 8.5 | Decanter cake |
| 3 | Pork/Beef | Pasteurised | pH treated Protastar (acc. to Example 4) | 84 | 7.5 | Decanter cake |
| 4 | Pork/Beef | Pasteurised | Soy Isolate | 90 | 6.9-7.3 | Hamultop 800 (Hahn & Co) |
| 5 | Pork/Beef | Pasteurised | Control | — | — | — |
| Series 2 | | | | | | |
| 1 | Pork/Beef | Sterilised | Protastar | 85 | 3.5 | Protastar |
| 2 | Pork/Beef | Sterilised | pH treated Protastar (acc. to Example 4) | 84 | 8.5 | Decanter cake |
| 3 | Pork/Beef | Sterilised | pH treated Protastar (acc. to Example 4) | 84 | 7.5 | Decanter cake |
| 4 | Pork/Beef | Sterilised | Soy isolate | 90 | 6.9-7.3 | Hamultop 800 (Hahn & Co) |
| 5 | Pork/Beef | Sterilised | Control | — | — | — |

TABLE 4

Recipe Meatloaf

| Ingredient | Control | All other samples |
|---|---|---|
| MEAT LOAF BASE | | |
| Water | 17.24 | 17.24 |
| Beef (80/20) | 15.28 | 10.28 |
| Pork neck trims (80/20) | 40.60 | 32.10 |
| Pork jowls or trim (40/60) | 24.40 | 20.40 |
| Sodium Nitrite | 0.10 | 0.10 |
| Sodium phosphate | 0.27 | 0.27 |
| Sodium ascorbate | 0.40 | 0.40 |
| Seasoning* | 1.71 | 1.71 |
| EMULSION | | |
| Water | — | 7.50 |
| Protein | — | 2.50 |
| Pork backfat | — | 7.50 |

*Seasoning consisted of 75% salt, and the rest; Pepper, mace, coriander, ginger, cardamom (purchased as a pack)

TABLE 5

Composition of the sample recipes (%)

| Component | Control | All other products |
|---|---|---|
| Analytical meat | | |
| content | 78.0 | 78.0 |
| Protein | 11.3 | 10.9 |
| Lean meat | 53.4 | 43.7 |
| Fat | 26.9 | 28.3 |
| Meat | 80.3 | 72.0 |
| Water | 57.9 | 56.8 |

The meat loafs were prepared as follows. First of all the meat types were minced to ensure each sample received approximately the same amount of lean meat or fat. They were then divided into their separate portions as indicated in table 4. The formulations were made in the order shown in table 3. For each series a control was made. For all the samples, the beef and the pork neck trim were put into the chopper with 100 ml of the water and the sodium nitrite, phosphate and ascorbate and seasoning. This was then chopped for a duration of 2 minutes. At this stage the remaining water, the extra water (from the emulsion), and the pork jowls/trim and back-fat were added. This was then mixed for another 5 minutes.

For series 1, the batter was then divided into 200 g cans, sealed and pasteurised for 40 minutes (at 85° C.) to an internal temperature of 75° C. In the case of series 2, cans were retorted for 20 minutes at 121° C. The cans were then cooled with running tap water and refrigerated overnight.

The cooking loss was determined by weighing the can with the meat ($W_{can+meat}$), then wiping free the meat and the can of any loose fat and water, and thereafter separately weighing the meat ($W_{meat}$), and the can ($W_{can}$). The cooking loss was calculated as:

$$100 - \frac{(W_{meat})}{(W_{can+meat}) - (W_{can})} \times 100$$

The results are shown in Table 6.

TABLE 6

Cooking loss of series 1 and 2

| | Pasteurised | | Sterilised | |
|---|---|---|---|---|
| Series 1 and 2 | Cook loss | pH* | Cook loss | pH* |
| 1. Protastar | 7.4 | 6.00 | 21.0 | 6.07 |
| 2. pH 8.5 treated Protastar | 5.6 | 6.15 | 14.2 | 6.15 |
| 3. pH 7.5 treated Protastar | 5.5 | 6.17 | 16.1 | 6.14 |
| 4. Soy Isolate | 5.3 | 6.12 | 13.9 | 6.09 |
| 5. Control | 6.4 | 6.10 | 19.9 | 6.11 |

*pH-value of the meat-loaf

It is clearly shown that the meat loaf containing Protastar treated according to the invention shows a significant improvement in the water binding capacity in comparison to the meat loaf containing untreated Protastar.

Table 6 also shows that it is possible to use a pH treated potato protein product to obtain a meat loaf with similar cooking loss in comparison to a meat loaf containing a commercially available soy isolate. Pasteurised pH-treated and untreated Protastar samples were a slightly darker pink than the soy and control. This difference was not as obvious in sterilised samples. Texture of the untreated Protastar samples were particularly gritty in comparison to the rest. The soy treated meat loaf had a distinct unpleasant flavour, whereas the Protastar and the pH treated Protastar samples had no detectable off-taste.

The data also show that the addition of a pH treated protein product did not significantly affect the pH of the final food product.

Example 6

The solubility of a potato protein product, treated according to the invention at pH 8.5 was determined at various pH values by the procedure described in A.-M. Hermansson, Functional properties of protein for food-swelling, The Lund Institute of Technology (S) 1971. The results are shown in the following table:

TABLE 7 effect of pH on the solubility of a pH-treated potato protein product

| pH of solvent | Solubility of potato protein (wt. %) |
|---|---|
| 11 | 2.5 |
| 8.5 | 1.8 |
| 7 | 1.1 |
| 6 | 1.2 |

The table clearly shows that the protein has a low solubility. Possibly at pH 11.5 a slight alkaline hydrolysis occurs.

The invention claimed is:

1. A method for improving one or more functional properties of a vegetable protein product, said method comprising isolating the vegetable protein product by thermal coagulation to obtain a vegetable protein product having a solubility of below 5 weight %, then adjusting the pH of the vegetable protein product having a solubility of below 5 weight % to a value between 8 and 10.5,
    wherein the vegetable protein product comprises one or more proteins originating from a root or tuber,
    wherein the vegetable protein product has a solubility of below 5 weight % after the pH has been adjusted to a value between 8 and 10.5;
    wherein the vegetable protein product is a cake during adjustment of the pH;
    wherein the functional property is selected from water-binding properties and/or fat-binding properties, and
    wherein one or more functional properties of the vegetable protein product is improved.

2. A method according to claim 1, wherein adjusting the pH comprises adding at least one base, selected from the group consisting of alkali metal and alkali earth metal salts of hydroxide, carbonate, bicarbonate, phosphate and monohydrogenphosphate.

3. A method according to claim 1, further comprising homogenizing the vegetable protein product during and/or after adjustment of the pH.

4. A method according to claim 1, wherein adjustment of the pH is performed at a temperature in the range of 0 to 100° C.

5. A method according to claim 1, wherein the vegetable protein product comprises a protein from a vegetable selected from the group consisting of potato, waxy potato, arrow root, cassaya, waxy cassaya, sweet potato, yam and/or taro.

6. A method according to claim 1, wherein the protein product further comprises a compound selected from the group consisting of lipids, carbohydrates, salts and fibers.

7. A method according to claim 1, further comprising washing the vegetable protein product with an acid solution before adjusting the pH.

8. A protein product obtainable by a method according to claim 1.

9. A food product comprising a protein product according to claim 8.

10. A food product according to claim 9, having a pH in the range of about 4-7.

11. A food product according to claim 10, wherein the food product is pasteurised, sterilised and/or emulsified.

12. Use of a protein product according to claim 8 in a food product, to improve the water- and/or fat-retention of said food product.

13. Use according to claim 12, wherein the food product has a pH of approximately 4-7.

14. A method according to claim 4, wherein the temperature is in a range of 10-30° C.

15. A method according to claim 1, wherein the vegetable protein product comprises a dry substance content in the range of 20-99 wt % during adjustment of the pH.

16. A method according to claim 1, further comprising drying the vegetable protein product to a water content of less than 12 wt % after adjustment of the pH.

17. A method for improving one or more functional properties of a vegetable protein product, said method comprising isolating the vegetable protein product by thermal coagulation to obtain a vegetable protein product having a solubility of below 5 weight %, then adjusting the pH of the vegetable protein product having a solubility of below 5 weight % to a value between 8 and 10.5,
    wherein the vegetable protein product comprises one or more proteins originating from a root or tuber,
    wherein the vegetable protein product has a solubility of below 5 weight % after the pH has been adjusted to a value between 8 and 10.5;
    wherein the vegetable protein product is a paste during adjustment of the pH;
    wherein the functional property is selected from water-binding properties and/or fat-binding properties, and
    wherein one or more functional properties of the vegetable protein product is improved.

18. A method for improving one or more functional properties of a vegetable protein product, said method comprising isolating the vegetable protein product by thermal coagulation to obtain a vegetable protein product having a solubility of below 5 weight %, then adjusting the pH of the vegetable protein product having a solubility of below 5 weight % to a value between 8 and 10.5,
    wherein the vegetable protein product comprises one or more proteins originating from a root or tuber,
    wherein the vegetable protein product has a solubility of below 5 weight % after the pH has been adjusted to a value between 8 and 10.5;
    wherein the vegetable protein product is a semi-dry during adjustment of the pH,
    wherein the functional property is selected from water-binding properties and/or fat-binding properties, and
    wherein one or more functional properties of the vegetable protein product is improved.

* * * * *

UNITED STATES PATENT AND TRADEMARK OFFICE
CERTIFICATE OF CORRECTION

| | | |
|---|---|---|
| PATENT NO. | : 7,972,647 B2 | Page 1 of 1 |
| APPLICATION NO. | : 10/479644 | |
| DATED | : July 5, 2011 | |
| INVENTOR(S) | : Marchal et al. | |

It is certified that error appears in the above-identified patent and that said Letters Patent is hereby corrected as shown below:

Column 4, line 60:

Now reads: "...animals the glyco-alkoloid..."
Should read: --...animals. The glyco-alkoloid...--

Signed and Sealed this

Thirteenth Day of November, 2012

David J. Kappos
*Director of the United States Patent and Trademark Office*